(12) United States Patent
Labana

(10) Patent No.: US 6,928,584 B2
(45) Date of Patent: Aug. 9, 2005

(54) SEGMENTED PROTECTION SYSTEM AND METHOD

(75) Inventor: Paramjit S. Labana, Herndon, VA (US)

(73) Assignee: Tellabs Reston, Inc., Reston, VA (US)

(*) Notice: Subject to any disclaimer, the term of this patent is extended or adjusted under 35 U.S.C. 154(b) by 616 days.

(21) Appl. No.: 09/989,693

(22) Filed: Nov. 21, 2001

(65) Prior Publication Data

US 2002/0083365 A1 Jun. 27, 2002

Related U.S. Application Data

(60) Provisional application No. 60/252,457, filed on Nov. 22, 2000.

(51) Int. Cl.$^7$ .................................................. G06F 11/00
(52) U.S. Cl. ............................. 714/13; 714/4; 714/10; 714/11; 714/43; 714/56
(58) Field of Search ................................ 714/4, 10, 11, 714/13, 43, 56

(56) References Cited

U.S. PATENT DOCUMENTS

| | | | |
|---|---|---|---|
| 4,984,240 A | * | 1/1991 | Keren-Zvi et al. .............. 714/4 |
| 6,271,605 B1 | * | 8/2001 | Carkner et al. ............. 307/125 |
| 6,615,362 B1 | * | 9/2003 | Daruwalla et al. ............. 714/4 |
| 6,792,558 B2 | * | 9/2004 | Kuwako et al. .............. 714/13 |

OTHER PUBLICATIONS

Synchronous Optical Network (SONET)–Automatic Protection Switching, American National Standards Institute T1.105.01 (1998).

* cited by examiner

*Primary Examiner*—Bryce P. Bonzo
*Assistant Examiner*—Emerson Puente
(74) *Attorney, Agent, or Firm*—Baker Botts L.L.P.

(57) ABSTRACT

A segmented protection system and method. The invention comprises a plurality of Processing Modules arranged in series along a Protection Bus. A number of Protection Groups may be formed along the Protection Bus, with each Protection Group comprising at least one Protection Processing Module and at least one Working Processing Module. Upon failure of the Working Processing Module, the Protection Processing Module substitutes for the failed Working Processing Module.

38 Claims, 9 Drawing Sheets

FIG. 10

| Slot | Label |
|---|---|
| SLOT #1 | DS1 P |
| SLOT #2 | DS1 |
| SLOT #3 | DS1 |
| SLOT #4 | DS1 |
| SLOT #5 | DS1 |
| SLOT #6 | DS1 P |
| SLOT #7 | DS1 |
| SLOT #8 | NCPM |
| SLOT #9 | NCPM |
| SLOT #10 | DS1 |
| SLOT #11 | DS1 P |
| SLOT #12 | DS1 |
| SLOT #13 | DS1 |
| SLOT #14 | DS1 |
| SLOT #15 | DS1 |
| SLOT #16 | DS1 |

Groups: SLOT #1–#5 = GROUP #1; SLOT #6–#7 and SLOT #10 = GROUP #2; SLOT #11–#16 = GROUP #3.

20

SEGMENTED PROTECTION SYSTEM AND METHOD

RELATED APPLICATION

This application claims priority under 35 U.S.C. 517 119 to provisional application No. 60/252,457, filed Nov. 22, 2000, the entirety of which is incorporated herein by reference.

BACKGROUND OF THE INVENTION

1. Field of the Invention

This invention generally relates to protection systems, and more particularly to protection systems utilizing a Protection Bus to facilitate backup protection for one or more working devices.

2. Description of the Background Art

In a typical communications environment, a service provider may offer a number of services to its customers, such as DS1, DS3, OC-N or Ethernet services. In order to provide reliable service, service providers normally employ protection systems that provide backup capabilities in case of equipment failure. For example, a communication system that includes a plurality of Working Processing Modules, i.e., Modules used in a service capacity, may also include one or more backup Modules that can be used to replace a failed Working Processing Module to maintain system reliability.

Typical protection systems offer 1:n protection, where one Protection Processing Module serves as a backup for n Working Processing Modules in a Protection Group. In such systems, it may be a difficult task (for example) to reconfigure a protection system that provides 1:4 protection to instead provide 1:6 protection in response to changes in system demand, or (as another example), to provide a second 1:n Protection Group. Accordingly, there exists a need in the art for systems and methods that facilitate the creation and configuration of multiple Protection Groups.

SUMMARY OF THE INVENTION

The present invention provides a segmented protection system and method. The invention comprises a plurality of Processing Modules arranged in series along a Protection Bus. One or more Protection Groups may be formed along the Protection Bus, with each Protection Group comprising at least one Protection Processing Module and at least one Working Processing Module. In operation, upon failure of a Working Processing Module, the Protection Processing Module assumes the functionality associated with the failed Working Processing Module via connectivity that may include the Protection Bus.

In some embodiments, a protection system of the invention comprises (1) a plurality of Processing Modules arranged in series, where the plurality of Processing Modules includes at least one Protection Processing Module and at least two Working Processing Modules including a protected Working Processing Module; (2) a signal path comprising (a) a Normal Path that is connected to the protected Working Processing Module, and (b) a Failure Path that is connected to a Processing Module that is logically adjacent to the protected Working Processing Module; and (3) a Protection Bus for connecting the Protection Processing Module to the Processing Module logically adjacent to the protected Working Processing Module.

In some embodiments of the present invention, the Protection Bus comprises a plurality of Protection Bus Segments, each Protection Bus Segment forming a connection between two adjacent Processing Modules. In such embodiments, for each of i=1 to n Working Processing Modules, the invention comprises (1) an ith signal path comprising (a) an ith Normal Path that is connected to the ith Working Processing Module, and (b) an ith Failure Path that is connected to a Processing Module that is logically adjacent to the ith Working Processing Module; where the first Working Processing Module is the Working Processing Module that is adjacent to the Protection Processing Module, and the nth Working Processing Module is the Working Processing Module that is logically the farthest Processing Module from the Protection Processing Module.

In embodiments of the invention, Processing Modules comprise one or more switching devices that may be used to place a Working Processing Module into service and/or to place a Protection Processing Module into service. In some embodiments, such switching devices are disposed along a Protection Bus between adjacent Protection Bus Segments, and thus can be used to segment multiple Protection Groups along the Protection Bus.

In some embodiments, the present invention includes one or more Network Control Processing Modules ("NCPMs"). NCPMs may comprise a Distributed Processor Array and may be used to control the creation and operation of one or more Protection Groups.

Additional features and advantages of the invention are set forth in part in the description which follows, and are in part obvious from the description, or may be learned by practice of the invention. The features and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

In the accompanying drawings:

FIG. 10 depicts an embodiment of a protection system of the invention in which three Protection Groups have been formed from fourteen Processing Modules.

DEFINITIONS

Unless otherwise noted in the specification or in the claims, all of the terms used in the specification and in the claims will have the meanings normally ascribed to these terms by workers of ordinary skill in the art. Certain terms specifically comprise the meanings associated with them as follows:

Processing Module: A device that is capable of performing a processing function, such as routing, handling or processing data. In some embodiments, a Processing Module is embodied as a printed circuit board that may be plugged into a slot on a motherboard or backplane. A Processing Module may be dedicated for providing a particular type of service, such as DS1, DS3, OC-N or Ethernet service.

Protection Group: A group of Processing Modules arranged in series that perform one or more functions, such as providing DS1 and/or DS3 service. A Protection Group comprises a Protection Processing Module and one or more Working Processing Modules, such that upon failure of a Working Processing Module the Protection Processing Module substitutes for the failed Working Processing Module.

Working Processing Module: A Processing Module within a Protection Group that may provide one or more services, such as DS1 service.

Protection Processing Module: A Processing Module within a Protection Group that has been designated to provide backup service in case of failure in one or more of the Working Processing Modules.

Protected Working Processing Module: A Working Processing Module that is Protected by a Protection Processing Module, such that upon failure of the protected Working Processing Module, the Protection Processing Module substitutes for the protected Working Processing Module.

Protection Bus: A path that is capable of logically connecting a plurality of Processing Modules in series. In some embodiments where the Working Processing Modules in the protection system provide service over a plurality of paths, the Protection Bus comprises a plurality of paths.

Protection Bus Segment: A path along the Protection Bus that can form a connection between two adjacent Processing Modules.

Normal Path: A path that is capable, either alone or in conjunction with other paths and/or devices, of providing a route used by a Working Processing Module during a normal operation.

Failure Path: A path that is capable, either alone or in conjunction with other paths and/or devices, of providing a route used by a Protection Processing Module during a failure mode of operation.

Figure 1:
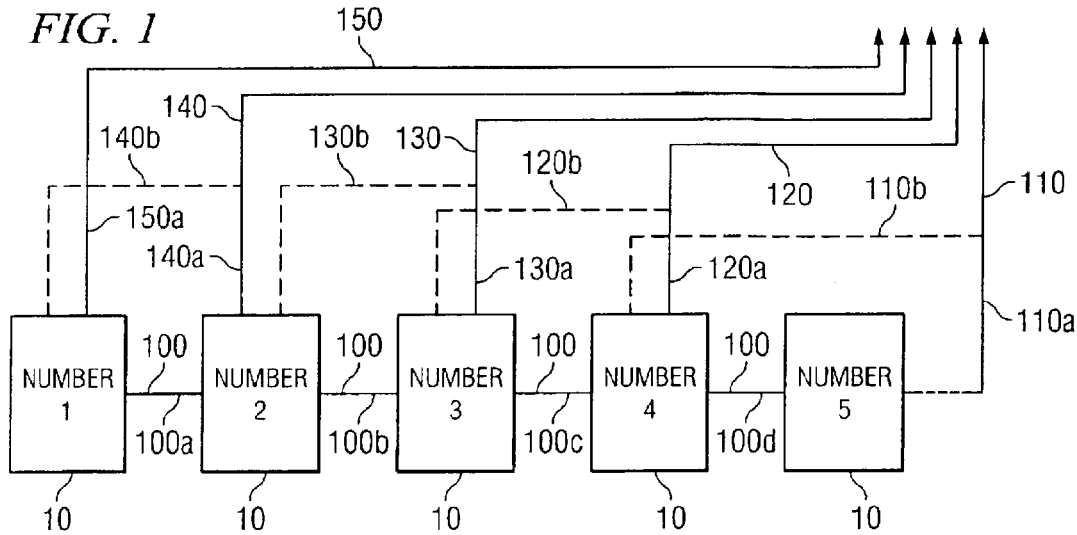
FIG. 1 depicts a plurality of Processing Modules arranged in series along a Protection Bus.

Series, in series: A method of interconnecting a plurality of components such that a signal travels sequentially through each of the components along a specified path. For example, the Processing Modules depicted in FIG. 1 are all considered to be in series along the path defined by the Protection Bus 100. For purposes of this patent application, the components in FIG. 1 are considered to be in series regardless of the position of any switching components separating the Protection Bus Segments. In addition, for purposes of this patent application, a Protection Group including a terminal slot or terminal Processing Module in a set of slots or Processing Modules is considered to be "in series," even though the terminal slot or terminal Processing Module may not be capable of being connected to its logically adjacent slot or Processing Module.

Terminal: The terminal slot or terminal Processing Module in a Protection Group is the slot or Processing Module having the highest number of slots or Processing Modules in the series of slots or Processing Modules between it and the protection slot or Protection Processing Module associated with the Protection Group. A terminal slot or terminal Processing Module may be connected to the Protection Bus, but in some embodiments, need not be connected to the Protection Bus.

Adjacent: Processing Modules that are directly coupled via a specified path are considered to be adjacent. Non-adjacent Processing Modules are either not coupled via a specified path, or are coupled via a specified path only through an additional, intermediate Processing Module.

Logically adjacent: A Processing Module that is connected to a failure path associated with the signal path of another Processing Module is considered to be "logically adjacent" to the other Processing Module. In FIG. 1, IOB #3 is logically adjacent to IOB #4 and IOB #2 is logically adjacent to IOB #3. Typically, the logically adjacent Processing Module precedes the specified Processing Module in a series that originates at the Protection Processing Module. A Processing Module that is "logically adjacent" to another Processing Module need not necessarily be adjacent to the other Processing Module, as the terms "adjacent" and "logically adjacent" are used in this application. For example, in a case where a terminal Processing Module that is a member of a Protection Group is not capable of being connected to the Protection Bus, the Processing Module immediately preceding the terminal Processing Module in the Protection Group series would be logically adjacent to the terminal Processing Module without being adjacent to the terminal Processing Module.

Logically the farthest Processing Module from the Protection Processing Module: The Working Processing Module at the end of a Protection Group series that originates with the Protection Processing Module may be referred to as "logically the farthest Processing Module from the Protection Processing Module" and may also be referred to as the "terminal Processing Module." As already noted, the terminal Processing Module may be considered for purposes of this application to be in series even though it is not actually connected to its logically adjacent Processing Module along the Protection Bus. In FIG. 1, IOB # 5 is the Working Processing Module that is logically farthest from the Protection Processing Module. In FIG. 10, the IOBs occupying slots #5, #10, and #14 are the IOBs that are logically farthest within their respective Protection Groups.

Distributed Processor Array: One or more processors that are logically or physically coupled, or both. For example, a single processor is a Distributed Processor Array. Another example of a Distributed Processor Array is a plurality of processors that are in physically different locations but are logically or physically coupled, or both.

Processor: A physical or virtual element whose operation is controlled by one or more computer programs. Processors comprise general purpose computer systems, special purpose computer systems, distributed computer systems, processor chips, discrete electronic circuits, processors that are simulated by software, and other computer processing devices as are known in the art.

Network Control Processing Module (NCPM): A Processing Module that may be used to control the creation and operation of a Protection Group. A NCPM may comprise a Distributed Processor Array.

Switching device: A device that selects, or may be used to select, a path or circuit for sending a signal to its next destination. A switching device may, for example, be embodied as a mechanical switch, an optical switch, an electrical switch or another kind of switching device as is known in the art.

DETAILED DESCRIPTION

Acts performed by systems, methods, apparatus elements, and apparatus functions of the present invention may be implemented, as is known in the art, as software running on general purpose computers or special purpose computers, as hardware, or as combinations of software and hardware.

FIG. 1 depicts a plurality of Processing Modules 10 connected in series. As depicted in FIG. 1, each Processing Module is connected to one or more adjacent Processing Modules 10 via a Protection Bus 100, including Protection Bus Segments 100a, 100b, 100c, and 100d. Each Processing Module 10 may be configured to handle one or more services, for example, such as DS1, DS3, OC-N or Ethernet traffic. The Processing Modules may be part of a larger communications system, such as the OSX-6000 available from Ocular Networks, Sunset Corporate Plaza II, 11109 Sunset Hills Road, Reston, Va. 20190.

In the embodiment of FIG. 1, Processing Modules 10 (#1–#5) are associated with a number of signal paths (110, 120, 130, 140, and 150). Each signal path in FIG. 1 comprises a Normal Path (110a, 120a, 130a, 140a, and 150a). Signal paths 110, 120, 130, 140 comprise Failure Paths 110b, 120b, 130b, and 140b, respectively. The Normal Paths may be used, for example, when Processing Modules 10 are functioning in a normal mode of operation. A Failure Path may be used, for example, to replace a Working Processing Module with a Protection Processing Module during a failure mode of operation. Processing Modules 10 are arranged in series along Protection Bus 100, with a Protection Bus Segment (100a, 100b, 100c, and 100d) connecting adjacent Processing Modules. In the embodiment shown in FIG. 1, Processing Module #1 can be designated as the Protection Processing Module for the Protection Group comprising Processing Modules #1–#5. In some embodiments and for example, when the Protection System is enabled, Processing Module #1 serves as a backup for any one of Processing Modules #2–5. If the failed Processing Module is Processing Module #5, Processing Module #1 provides the service previously provided by Processing Module #5 through a path formed over Protection Bus 100, through Processing Modules #2–4, and over Failure Path 110b. If the failed Processing Module is Processing Module #4, Processing Module #1 provides the service previously provided by Processing Module #4 through a path formed over Protection Bus 100, through Processing Modules #2 and #3, and over Failure Path 120b. If the failed Processing Module is Processing Module #3, Processing Module #1 provides the service previously provided by Processing Module #3 through a path formed over Protection Bus 100, through Processing Module 2, and over Failure Path 130b. Finally, if the failed Processing Module is Processing Module #2, Processing Module #1 provides the service previously provided by Processing Module #2 over Failure Path 140b.

As is apparent from FIG. 1, with appropriately configured wiring (as, for example, in a backplane, where the protection Modules are input/output boards (IOBs) that can be inserted into slots in the backplane), the Protection Group can easily be expanded to accommodate additional Processing Modules, thereby changing the 1:4 Protection Group of FIG. 1 to, for example, a 1:5, 1;6 or 1:20 Protection Group. In the case of a 1:20 Protetion Group, Processing Nodules #6–#20 would be protected in substantialy the same manner as described above for Processing Modules #2—4. A set of 20 Processing Modules arranged in this manner can also be separated into a plurality of separate 1:n Protection Groups, each Protection Group having a Protection Processing Module and one or more Working Processing Modules. In some embodiments where there are multiple Protection Groups, each Protection Group operates completely independently of any other Protection Group, for example, to provide different services.

In an embodiment comprising a backplane with slots for twenty Processing Modules, it is not strictly necessary that the terminal slot in the set of twenty slots actually be connected to the Protection Bus, as the Processing Module occupying that slot does not serve as a logically adjacent Processing Module to a failed Processing Module. While in such embodiments, the terminal slot is not strictly "in series" with the remainder of any Protection Group in which it may serve, Protection Groups comprising Working Processing Modules in such terminal slots function in substantially the same manner as Protection Groups not comprising such Working Processing Modules. As discussed above, such terminal slots are considered for purposes of this application to be in series with the other slots in a Protection Group that includes the terminal slot.

In some embodiments, the Protection Bus can form a ring. For example, in some embodiments, a right-most slot that would otherwise have naturally been a terminal slot (for example, because the wiring of the backplane determines that the Protection Processing Module will always occupy the left-most position in a Protection Group) is connected not only to its logically adjacent slot, but also to the left-most slot in the backplane via an extension of the protection bus and addition of other wiring that would cause the right-most slot to be adjacent as well as logically adjacent to the left-most slot. In such embodiments involving twenty slots, for example, a Processing Module in slot 18 might serve as the Protection Processing Module for a Protection Group occupying slots 18–20 and 1–3.

Figure 2:
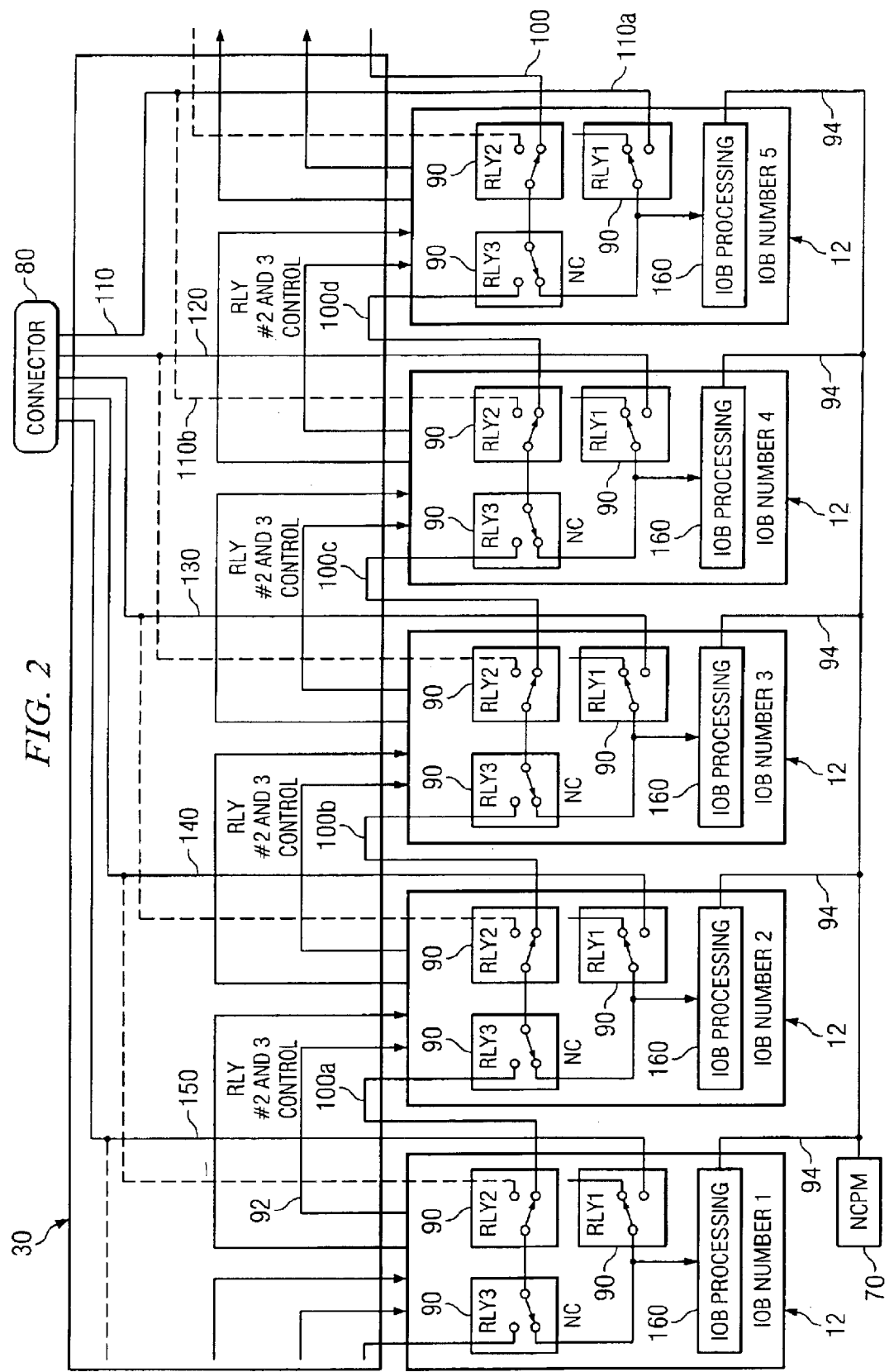
FIG. 2 depicts an embodiment of the present invention comprising a plurality of Processing Modules connected in series through a backplane.

FIG. 2 shows a plurality of Processing Modules logically connected in series through paths in a backplane 30. For ease of explanation, FIG. 2 depicts a single path to represent what may be multiple paths. Thus, a Processing Module may be connected to a large number of paths, in order to enable the Processing Module to process signals from a large number of sources. The Protection Bus may similarly comprise a large number of separate paths. In some embodiments involving Processing Modules serving a plurality of paths, switching between the paths may be controlled on an individualized basis, as discussed further with reference to FIG. 8, below. Furthermore, a given path (represented by a single line in FIG. 2) may in fact comprise more than one wire for the additional reason that such a path may include (for example) separate wires for receive and transmit signals, and grounding wires for each "transmission" wire and "receive" wire. Accordingly, the switching devices depicted in FIG. 2 are depicted as switching signals rather than wire connections; switching a particular signal may comprise switching multiple wire connections not depicted in FIG. 2.

The Processing Modules in FIG. 2 are embodied as Input/Output boards (IOBs) 12. The IOBs 12 include a processing block 160 that may comprise a Distributed Processor Array useful for performing data processing functions. These processing functions may include decoding or processing data transmissions, and communicating with NCPM 70 regarding the operation and state of the IOB. Each IOB 12 in FIG. 2 is associated with a signal path (110–150). Signal paths 110–140 each comprise a Normal Path and a Failure Path. For example, signal path 110 comprises Normal Path 110a that connects IOB #5 to external device 80, and also comprises Failure Path 110b that connects IOB #4—the IOB that is logically adjacent to IOB #5—to external device 80. Were IOB #5 to fail, as will be described below, its Failure Path 110b can be routed to a Protection Processing Module (e.g., IOB #1) along the Protection Bus 100 through a path traversing IOBs #2, #3 and #4 (in cases where IOB #1 is designated as the Protection Processing Module).

Each IOB 12 in FIG. 2 comprises three switching devices 90. The present invention may, however, work with a different number of switching devices than that shown in FIG. 2. Switching devices 90 may be mechanical or electrical relays, optical relays, solid state devices, or other devices capable of providing the functionality of a switch in a signal path. In the embodiments depicted in FIGS. 2, 4, 6, 8–9, and 11, the switching devices are depicted as switching between a pole marked "NC" and an unmarked pole. In some embodiments, (i) when a switching device is not activated, the switching device forms a connection to the "NC" or "normally closed" pole and (ii) when a switching device is activated, the switching device forms a connection to the unmarked pole.

In some embodiments, a protection system of the present invention uses switching devices to connect the Failure Path entering a given IOB to a Protection Bus Segment connected to that IOB, in order to provide a path to connect the Protection Processing Module in failure operation. In the embodiment depicted in FIG. 2, switching devices 90 are labeled RLY #1, RLY #2 and RLY #3. In typical embodiments, each IOB 12 may comprise multiple sets of these three switching devices, where each set of three switching devices corresponds to one port associated with the IOB. In the embodiment depicted in FIG. 2, each IOB 12 typically controls its own switching devices (RLY #1, RLY #2, and RLY #3) under the direction of NCPM 70. Although NCPM 70 is shown in FIG. 2 separately from backplane 30, in some embodiments NCPM 70 communicates with IOBs 12 through wiring in backplane 30. In a typical embodiment involving a backplane having slots for accommodating IOBs, slots are provided for the NCPMs alongside the slots provided for the IOBs. In some embodiments, the slots for the NCPMs and slots for the IOBs are configured differently to prevent an operator from mistakenly placing an NCPM in an IOB slot, or an IOB in an NCPM slot.

In FIG. 2, each IOB has a switching device link 92 (labeled as RLY #2 & 3 CTRL) to an adjacent IOB to the right. Switching device link 92 may be used, for example, when the adjacent IOB cannot, on its own, control its switching devices #2 and #3. In some embodiments, switching device link 92 comprises a "hard wire" between the IOBs. In some embodiments, switching device link 92 comprises a software connection between the IOBs.

In some embodiments, NCPM 70 provides centralized intelligence for controlling switching devices 90. For example and referring to FIG. 2, NCPM 70 may include IOB links 94 to processor 160 on each IOB 12. IOB links 94 allow NCPM 70 to command each IOB to control its own switching devices or the switching devices of an adjacent IOB through a switching device link 92. Switching device links 92 and IOB links 94 may be used, for example, to allow NCPM 70 to command an IOB to control the switching devices 90 of an adjacent IOB that is unable to control its own switching devices 90, such as in the case for example of an IOB processor 160 failure. In embodiments not employing NCPMs, a Distributed Processor Array for providing overall control of the protection system may reside within one or more Processing Modules.

The Protection Bus 100 depicted in FIG. 2 is capable of logically connecting each IOB to an adjacent IOB. Protection Bus 100 comprises Protection Bus Segments 100a, 100b, 100c and 100d. As shown in FIG. 2, segment 100a is capable of logically connecting IOB #1 to IOB #2; segment 100b is capable of logically connecting IOB #2 to IOB #3, segment 100c is capable of logically connecting IOB #3 to IOB #4; and segment 100d is capable of logically connecting IOB #4 to IOB #5. One or more Protection Groups may be formed along the Protection Bus 100 through, for example, operation of the switching devices 90.

In the embodiment of FIG. 2, the switching devices 90 are depicted in the positions they would occupy upon start-up or universal or system reset. No Protection Processing Modules have been designated in this embodiment; therefore, all Processing Modules can serve as Working Processing Modules. In the depicted embodiment, no Protection Groups have been designated. As shown, switching devices 90 are all in the NC position and Protection Bus 100 is isolated at each slot, because each Protection Bus Segment (100a–100d) ends at an open circuit at RLY #3 of an adjacent IOB to the right. In other words, Protection Bus 100 is segmented between IOBs 12. In addition, IOBs 12 are disconnected from external device 80 at RLY #1.

Figure 3:
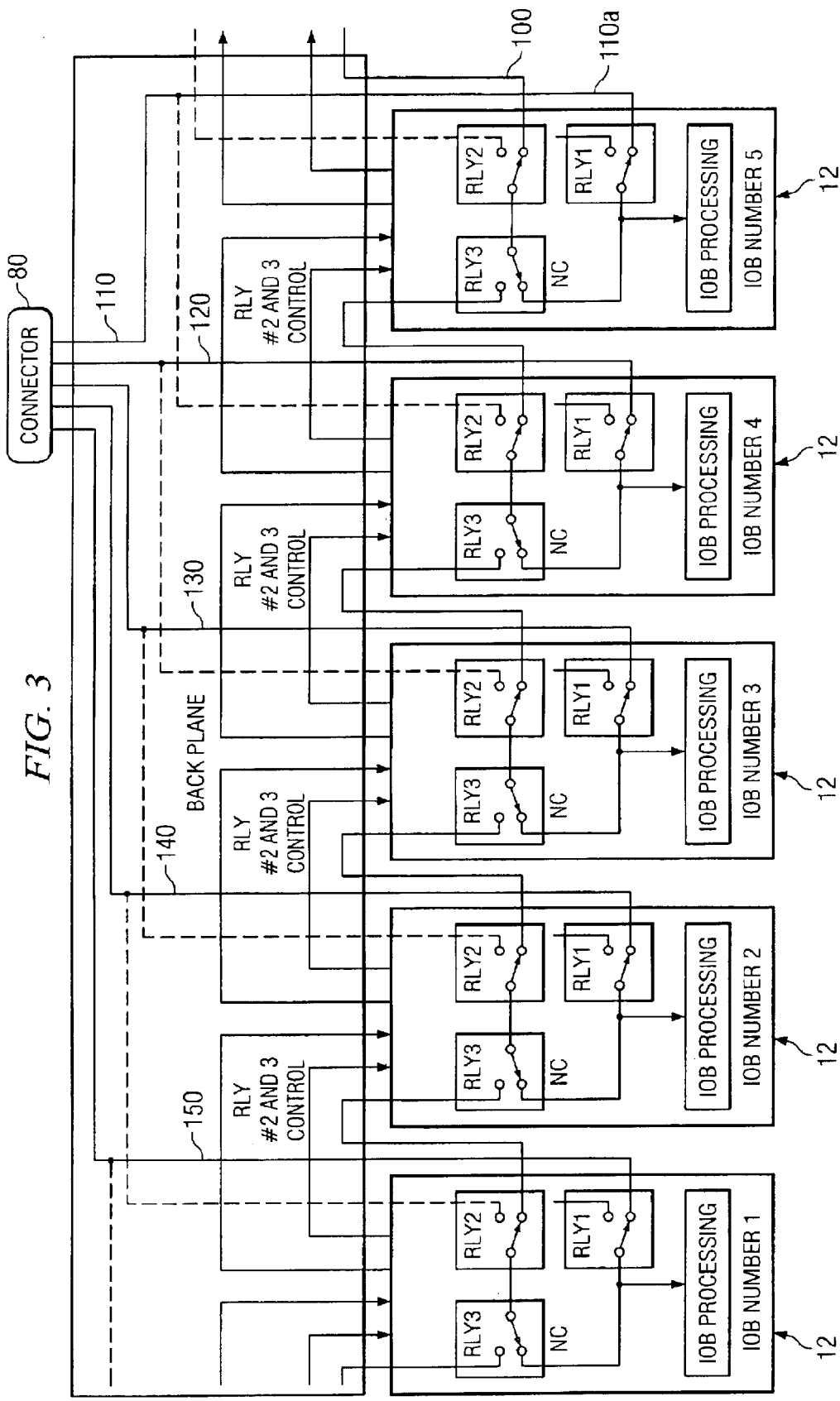
FIG. 3 depicts an embodiment of a protection system of the present invention comprising a plurality of Working Processing Modules arranged in series along a Protection Bus.

Referring to FIG. 3, to begin service (i.e., a normal mode of operation), the #1 RLY on each IOB 12 is switched to connect its IOB 12 to external device 80 via signal paths (110–150). As depicted in FIG. 3, the system has not yet created a Protection Group.

Figure 5:
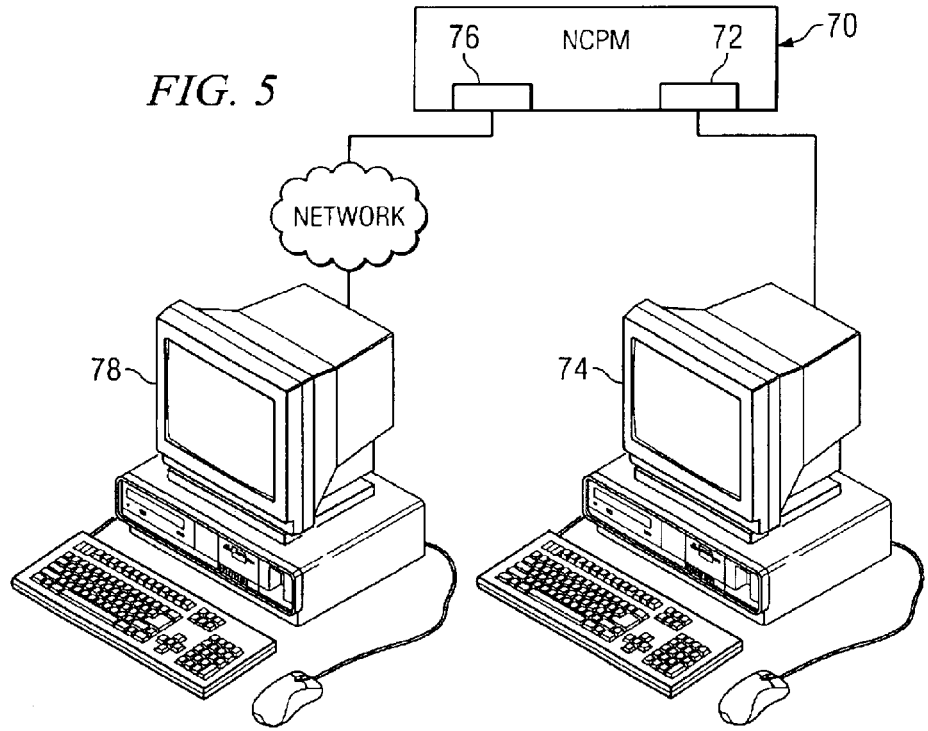
FIG. 5 depicts an NCPM that can be locally or remotely controlled in accordance with embodiments of the present invention.
Figure 4:
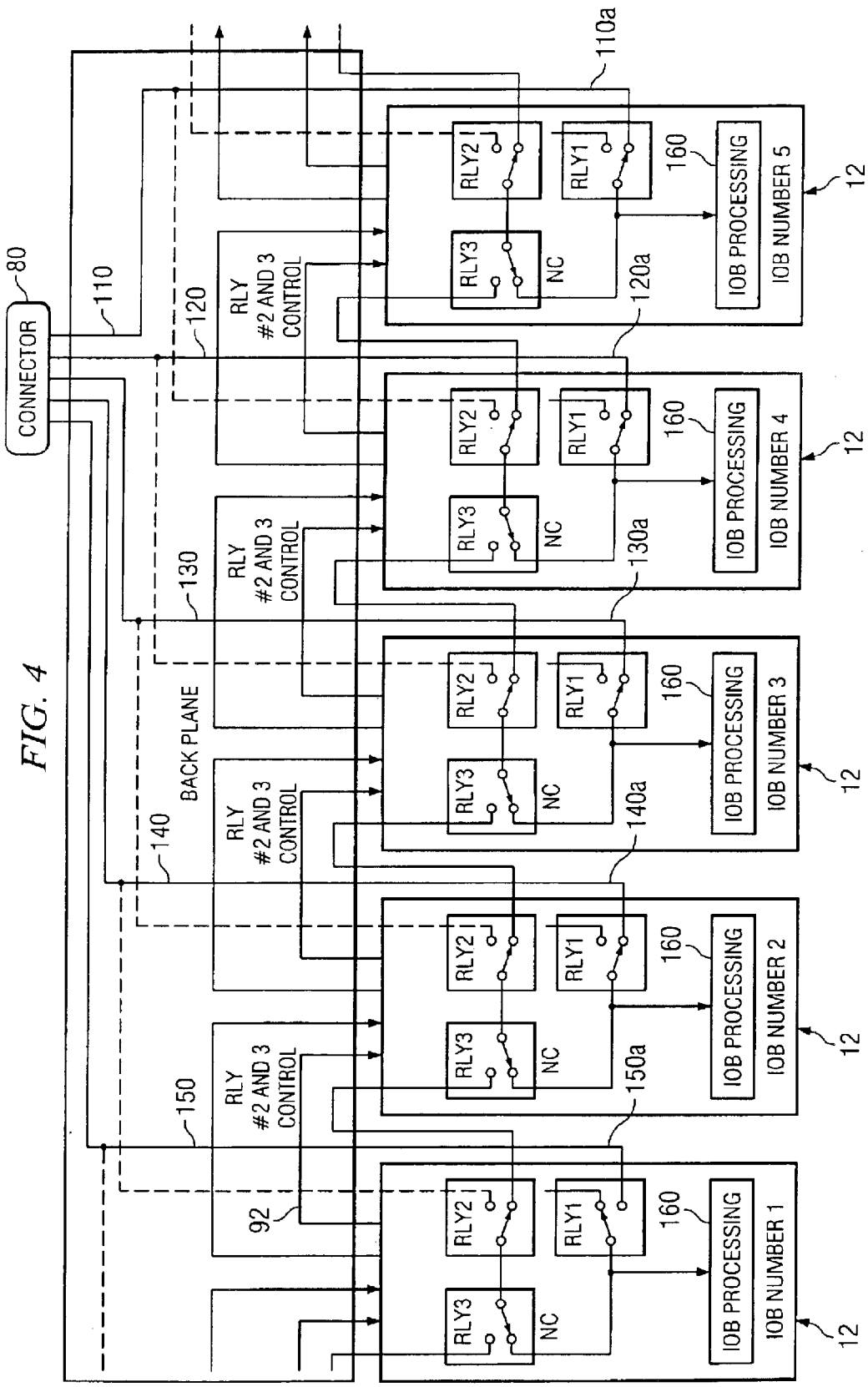
FIG. 4 depicts an embodiment of a protection system of the present invention utilizing a 1:4 protection scheme.

FIG. 4 depicts an embodiment of a single Protection Group (IOBs #1–#5), with the leftmost IOB (i.e., IOB #1) designated as a Protection Processing Module. The designation of IOB #1 as the Protection Processing Module may be accomplished, for example, by an operator communicating with the system, either locally or remotely, through NCPM 70, as depicted in FIG. 5. To designate IOB #1 as a Protection Processing Module, in some embodiments NCPM 70 instructs IOB #1 to switch its RLY #1 to the NC position to disconnect IOB #1 from external device 80. With RLY #2 and RLY #3 of IOB #1 remaining in the NC position, the processing block 160 of JOB #1 (the Protection Processing Module) is connected to the Protection Bus.

As noted, NCPM 70 may comprise local and/or remote control capabilities. For example, as shown in FIG. 5, NCPM 70 may comprise craft port 72 that allows an operator to connect with NCPM 70 through local computer 74. In some embodiments, NCPM 70 comprises a network management port 76 that allows an operator to connect with a number of network devices, including NCPM 70, through remote computer 78. In either of these embodiments, the operator may, for example, control the protection system by sending commands through NCPM 70.

Figure 6:
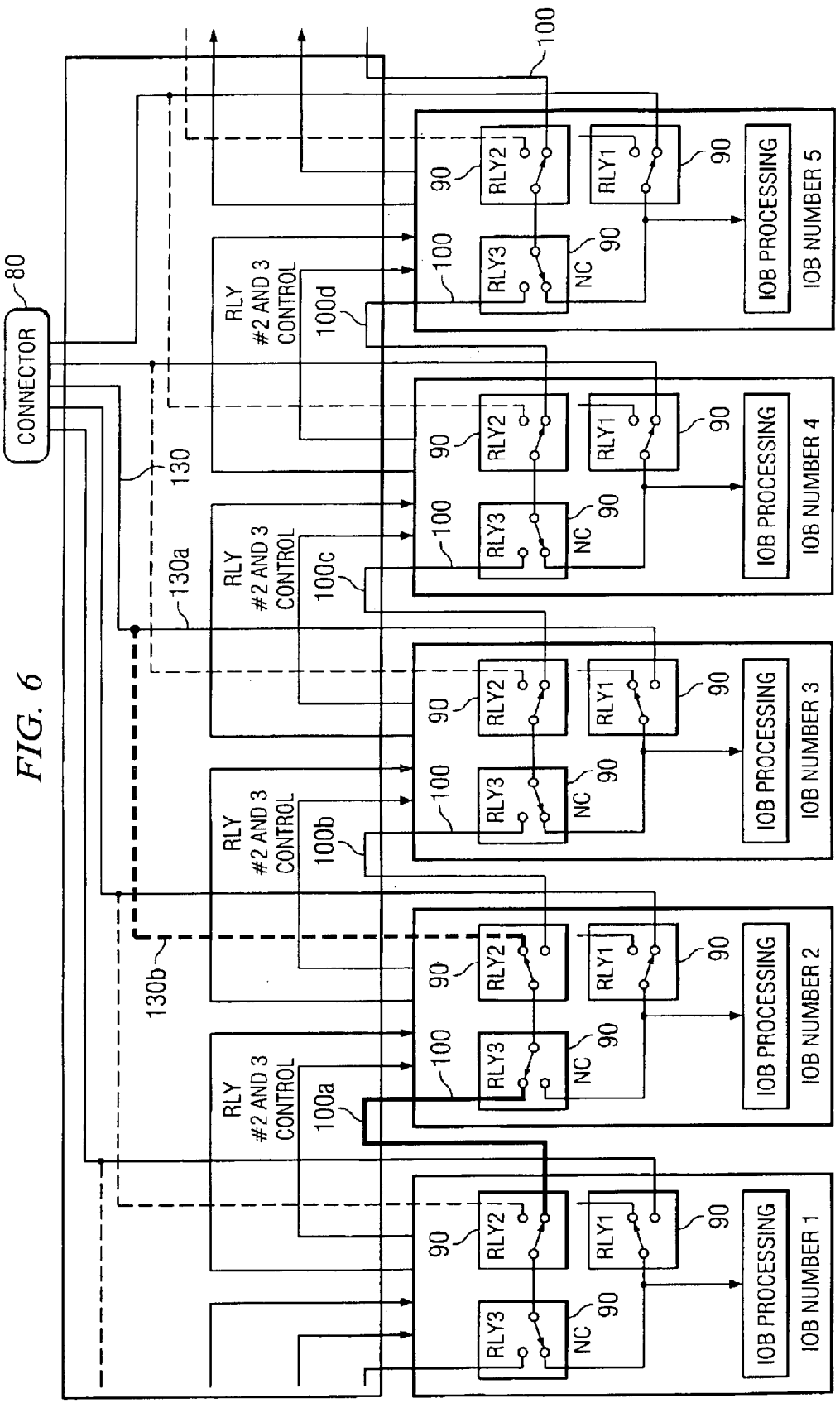
FIG. 6 depicts an embodiment of a protection system of the present invention utilizing a 1:4 protection scheme, where one Working Processing Module has failed.

FIG. 6 depicts the operation of embodiments of the protection system depicted in FIG. 4 upon detection of failure of an IOB. As depicted in FIG. 6, IOB #3 has failed. In some embodiments, the system detects the failure of IOB #3 by means of a status line, such as a fail line, associated with IOB #3, as known in the art. In some embodiments, a status line comprises a "hard wire" between an IOB and one or more other IOBs. In some embodiments, a status line comprises a computer link between an IOB and an NCPM or another IOB, or both.

Figure 7:
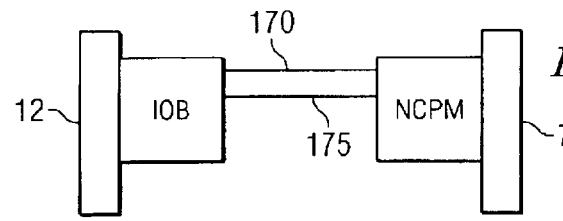
FIG. 7 depicts a fail line and a Processing Module present line, such as may be used in embodiments of the present invention.

Referring to FIG. 7, a fail line 170 may comprise a "hard wire" between IOB 12 and NCPM 70. During normal operation, IOB 12 may transmit, for example, a particular signal state to NCPM 70, thereby indicating that the IOB 12 is functioning properly. In situations, for example, where the processor fails, the signal state may change, thereby indicating to NCPM 70 that the processor is not functioning properly. In some embodiments, the failure signal is initiated, and thus the protection system is implemented, when the processor receives corrupted or unusable data. Other conditions, as are well known in the art, may also indicate an IOB failure and, therefore initiate a protection system response.

In some embodiments, the protection system includes a "Processing Module present" line 175 that indicates to NCPM 70 whether a Processing Module is present in a particular Slot. The Processing Module present line 175 may be associated with a status signal that indicates to NCPM 70 that a Processing Module is present in a slot. If a Processing Module is not present in, or is removed from, the slot, then the status signal may change, thereby indicating this condition to NCPM 70. In some embodiments, the Processing Module present line 175 is not associated with the functionality of the IOB or any processors within the IOB. Rather, in those embodiments, the Processing Module present line 175 only indicates the presence or absence of a Processing Module. In some embodiments, the protection system responds to a removed Processing Module in a similar manner as it responds to a Processing Module failure.

Referring back to FIG. 6, IOB #3 may have been, for example, serving a number of customers over its associated Normal Path prior to its failure. The protection system depicted in FIG. 6 automatically reroutes those customers to the Protection Processing Module (IOB #1) as follows:

1. The NCPM detects the failure of IOB #3 through a fail line associated with IOB #3. RLY #1 of IOB #3 goes to its NC position, either as a result of a command from the NCPM or as a result of a power failure within IOB #3, thereby disconnecting failed IOB #3 from external device 80.

2. IOB #4 maintains its RLY #2 and RLY #3 in their NC positions, as does IOB #5 and as would any other downstream IOBs.

3. The NCPM commands IOB #2 to switch its RLY #2 and RLY #3 away from their NC positions, thereby connecting Protection Bus Segments 100a and 100b to form a path along the Protection Bus 100 through IOB #2. This causes Failure Path 130b for IOB #3 to be connected to the Protection Processing Module (IOB #1).

In the embodiment depicted in FIG. 6, once the Protection Processing Module (IOB #1) has functionally replaced IOB #3 in the system, there is no further protection available for any remaining IOBs within the Protection Group. After IOB #3 has been either repaired or replaced, the system may be returned to its previous operating mode. For example, IOB #3 may be returned as a Working Processing Module and IOB #1 may again be available for failure protection.

Figure 8:
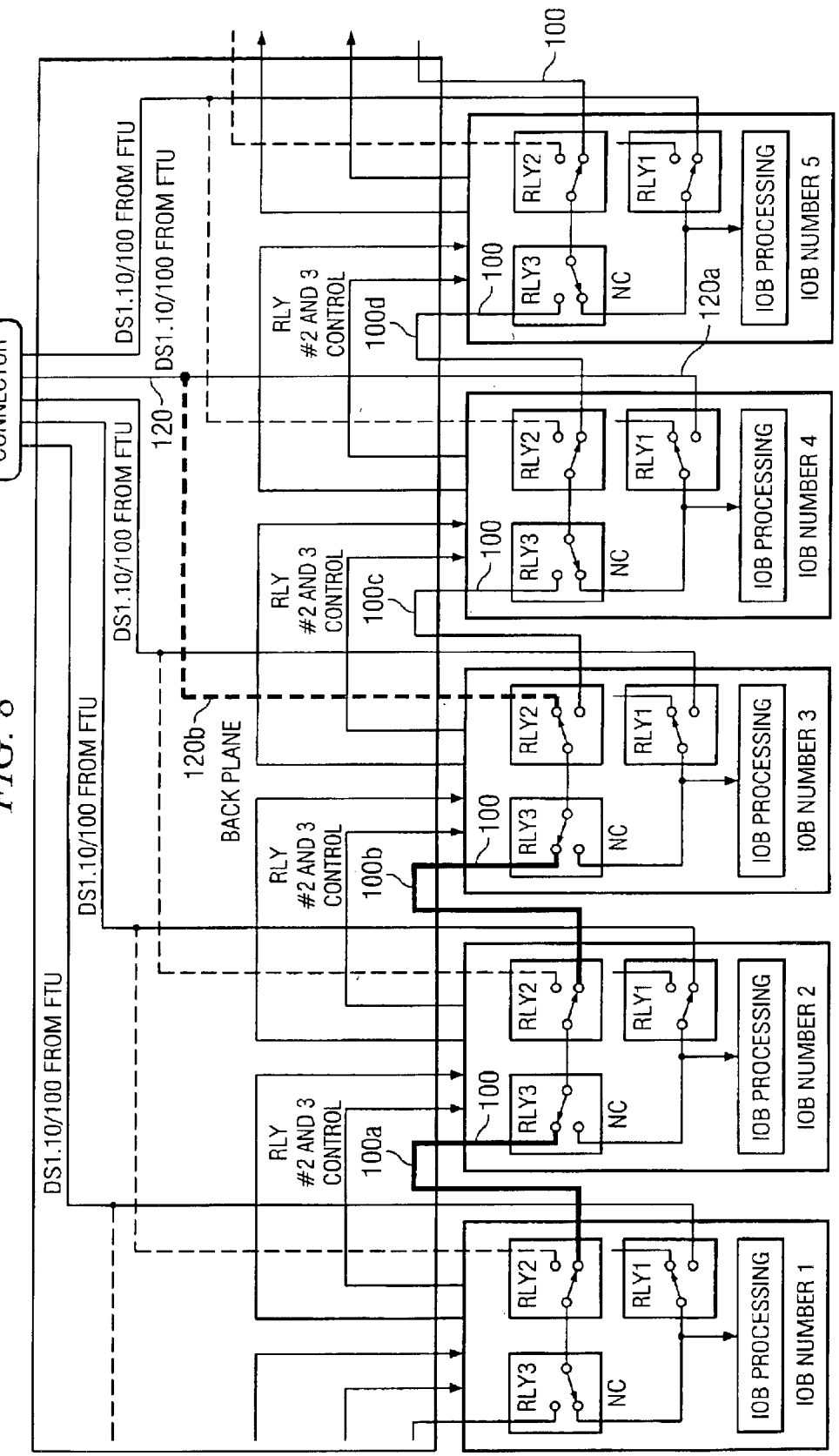
FIG. 8 depicts an embodiment of a protection system of the present invention utilizing a 1:4 protection scheme, where two Working Processing Modules have failed.

FIG. 8 depicts an embodiment of the present invention in which two IOBs within a single Protection Group have failed before the first-failed IOB can be repaired or replaced. In FIG. 8, IOB #4 failed first and IOB #3 failed second. In the embodiment of FIG. 8, the system reacts to the failure of IOB #4 in a manner similar to that described above with reference to FIG. 6. Upon failure of IOB #3, customers associated with IOB #3 will lose service, while customers associated with IOB #4 will continue to be served through the Protection Processing Module (IOB #1), as follows:

1. Upon failure of IOB #4, the system operates as follows:

a. The fail line of IOB #4 indicates its failure to the NCPM. RLY #1 of IOB #4 goes to its NC position, thereby isolating failed IOB #4 from its customers.

b. The NCPM commands IOB #3 to switch its RLY #2 and RLY #3 away from their NC positions, thereby joining Protection Bus Segments 100b and 100c to form a path along the Protection Bus 100 through IOB #3.

c. The NCPM commands IOB #2 to switch its RLY #2 to the NC position and switch its RLY #3 away from the NC position, thereby joining Protection Bus Segments 100a and 100b to form a path along the Protection Bus 100 through IOB #2. This causes Failure Path 120b for IOB #4 to be connected to the Protection Processing Module IOB #1), which now is connected to serve customers previously served by failed IOB #4.

2. Upon failure of IOB #3, the fail line associated with IOB #3 activates. RLY #1 of IOB #3 goes to its NC position, thereby isolating failed IOB #3 from its customers. In some embodiments of the invention where an IOB has multiple ports, each port on the IOB may be controlled on an individualized basis, thereby allowing operational ports on a IOB that has experienced a partial failure to continue providing service. For example, rather than disconnecting every customer from IOB #3, only those customers that are connected to a failed port within IOB #3 may be disconnected from IOB #3. The other RLY #1s (not depicted) on IOB #3 are, if present, left switched away from the NC position if they remain functional, thereby providing continued service through the working ports of IOB #3.

3. As a result of the failure of IOB #3, RLY #2 and RLY #3 of IOB #3 (which, in the embodiment depicted in FIG. 8, had been maintained switched away from their NC position by power received from IOB #3) switch to their NC position. The NCPM commands IOB #2 to take control of RLY #2 and RLY #3 of IOB #3 and switch these switching devices back away from their NC positions. In an embodiment, the NCPM also commands IOB #2 to maintain its RLY #2 and RLY #3 in the positions they assumed in step 1 above, thereby maintaining the connection between the Failure Path of IOB #4 and the Protection Processing Module.

It should be noted that if the second "failure" in a double-failure scenario is actually the removal from its slot of an IOB that is logically between the first-failed IOB and the Protection Processing Module, then the protection system will be unable to provide continuous service to the application served by the first-failed Processing Module. In some embodiments, in such cases the system provides the necessary switching to provide protection to the application served by the removed IOB. Thus, assuming that in the above example IOB #3 was removed from its slot, then IOB #4's customers would lose service, and RLY #2 on IOB #2 would switch away from its NC position to connect the Protection Bus to failure line 130b to enable the Protection Processing Module to substitute for IOB #3.

Figure 9:
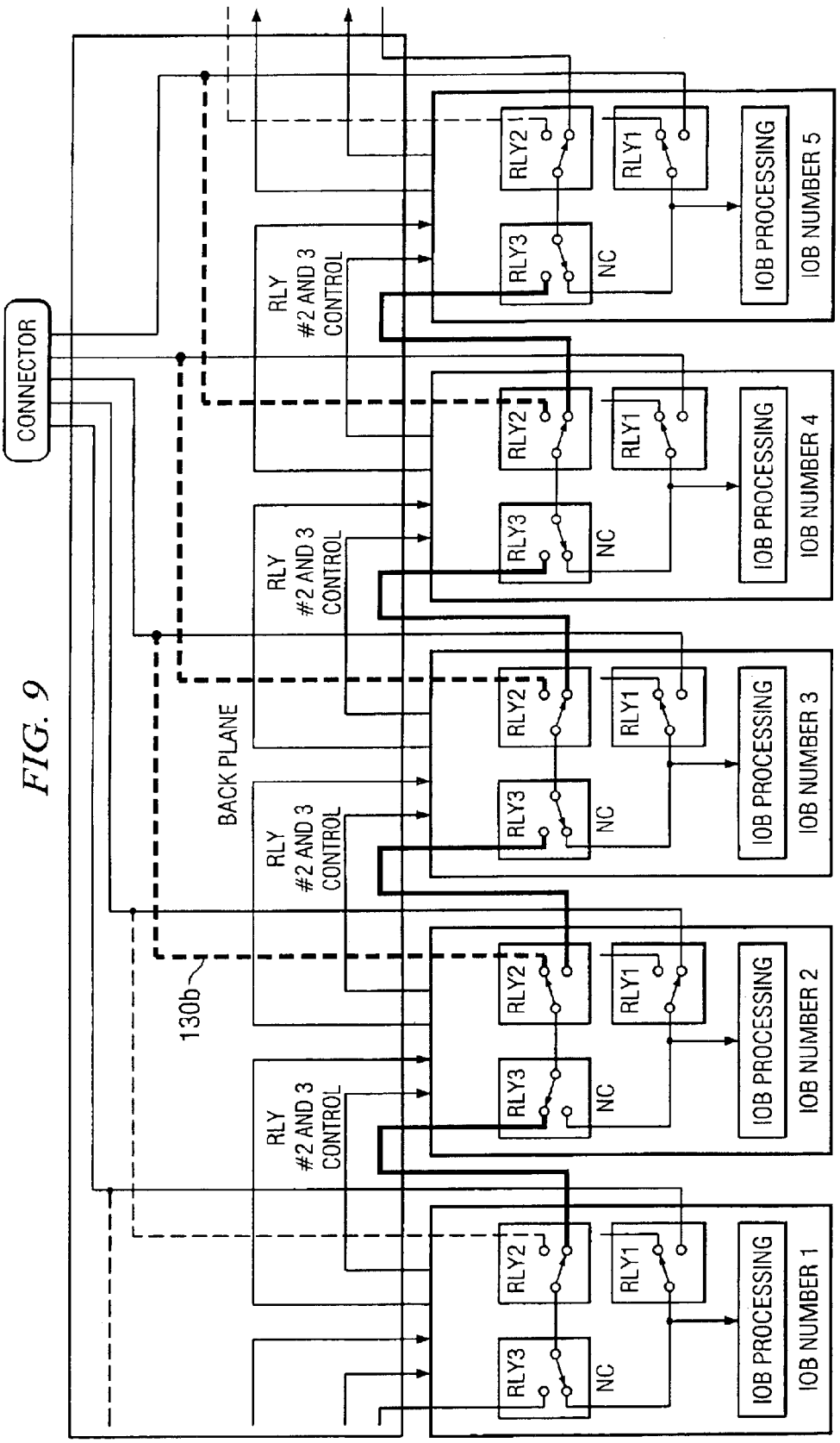
FIG. 9 depicts an embodiment of a protection system of the present invention utilizing a 1:4 protection scheme, where three Working Processing Modules have failed.

FIG. 9 depicts a situation in which three IOBs within a single Protection Group have failed before any failed IOB has been replaced or repaired. IOB #5 is the first to fail, followed by IOB #4 and then by IOB #3. The failure of IOB #3 may prevent it from controlling RLY #2 and RLY #3 on IOB #4. In such a case, customers on IOB #5 will lose service. IOB #2 is able to operate the switching devices of IOB #3, allowing for either IOB #3 or IOB #4 to be protected through the Protection Processing Module (e.g., IOB #1). FIG. 9 depicts, for example, the transfer of prior protection for IOB #5 to IOB #3. This process is as follows:

1. The failure of IOBs #4 and #5 is handled similarly to the operation described above regarding the double failure scenario in FIG. 8. As such, prior to the failure of IOB #3, the service originally provided by IOB #5 (the first failed IOB) is provided by the Protection Processing Module (IOB #1) and IOB #4 remains in a failed state.

2. Upon failure of IOB #3, protection for failed IOB #5 cannot be maintained, and Protection Processing Module (IOB #1) substitutes for IOB #3 in the following manner:

a. IOB #3 indicates its failure to the NCPM through its fail line. RLY #1 of IOB #3 goes to its NC position, thereby isolating failed IOB #3 from its customers. RLY #2 and RLY #3 of IOB #3, which had been switched to positions away from the NC position in order to complete the Protection Bus through JOB #3 to enable IOB #1 to substitute for IOB #5, switch to their NC position, thereby disconnecting the Protection Bus at IOB #3.

b. NCPM commands IOB #2 to switch its RLY #2 and RLY #3 away from the NC position, thereby connecting Failure Path 130b for IOB #3 to the Protection Processing Module (IOB #1).

As already mentioned, the wiring depicted in FIGS. 1, 2–4, 6, and 8–9 can be replicated as many times as desired to accommodate additional Processing Modules to be placed along the Protection Bus after the right-most Processing Module depicted in those figures. According, a box comprising any number of slots (subject to physical constraints on the size of the backplane) can be created in order to provide a protection system as described above, with the capability of designating any set of working Module slots in series as a Protection Group. FIG. 10 thus shows an embodiment of the invention in which fourteen Processing Module slots have been segmented into three Protection Groups and one unprotected group. The manner in which these Protection Groups can be segmented will be discussed in more detail below. Protection Group 1 comprises slots #1 through #5, with slot #1 acting as the Protection Processing Module slot and slots #2 through #5 provided as Working Processing Module slots.

Protection Group 2 comprises slots #6, #7, and #10, with slot #6 acting as the Protection Processing Module slot and slots #7 and #10 provided as Working Processing Module slots. Notably, slots #8 and #9 comprise Network Control Processing Module (NCPM) slots, which are not part of Protection Group 2. In some embodiments, these slots are dedicated as NCPM slots and may not be used as Working Processing Module slots. Although the slots in Group 2 are not physically in series (i.e., slots #7 and #10 are physically interrupted by slots #8 and #9), they may nonetheless comprise a logical series through, for example, wiring in a backplane.

Protection Group 3 comprises slots #11 through #14, with slot #11 acting as the Protection Processing Module slot and slots #12 through #14 being Working Processing Module slots. As depicted in FIG. 10, each Protection Group comprises a Protection Processing Module slot and a number of Working Processing Module slots. Slots #15 and #16 comprise an unprotected group that may accept unprotected Working Processing Modules.

The decision regarding how to configure a Protection Group, how many Protection Groups should exist and/or whether to leave a group of Processing Modules unprotected may rest on several factors, such as for example, (i) the cost of the Protection Group, (ii) the criticality of the data transmission and (iii) the likelihood of equipment failure. In some embodiments, including the embodiment shown in FIG. 10, the Protection Processing Module slot occupies the logical, left-most position within each Protection Group. This positioning of the Protection Processing Module slot is typically determined by wiring in a backplane. For example, in the embodiment depicted in FIG. 2, the backplane is wired such that any Protection Processing Module would occupy the left-most position in its Protection Group. A different backplane wiring configuration could be used, for example, as known in the art, to require that the Protection Processing Module occupy the logical right-most slot within its Protection Group.

Figure 11:
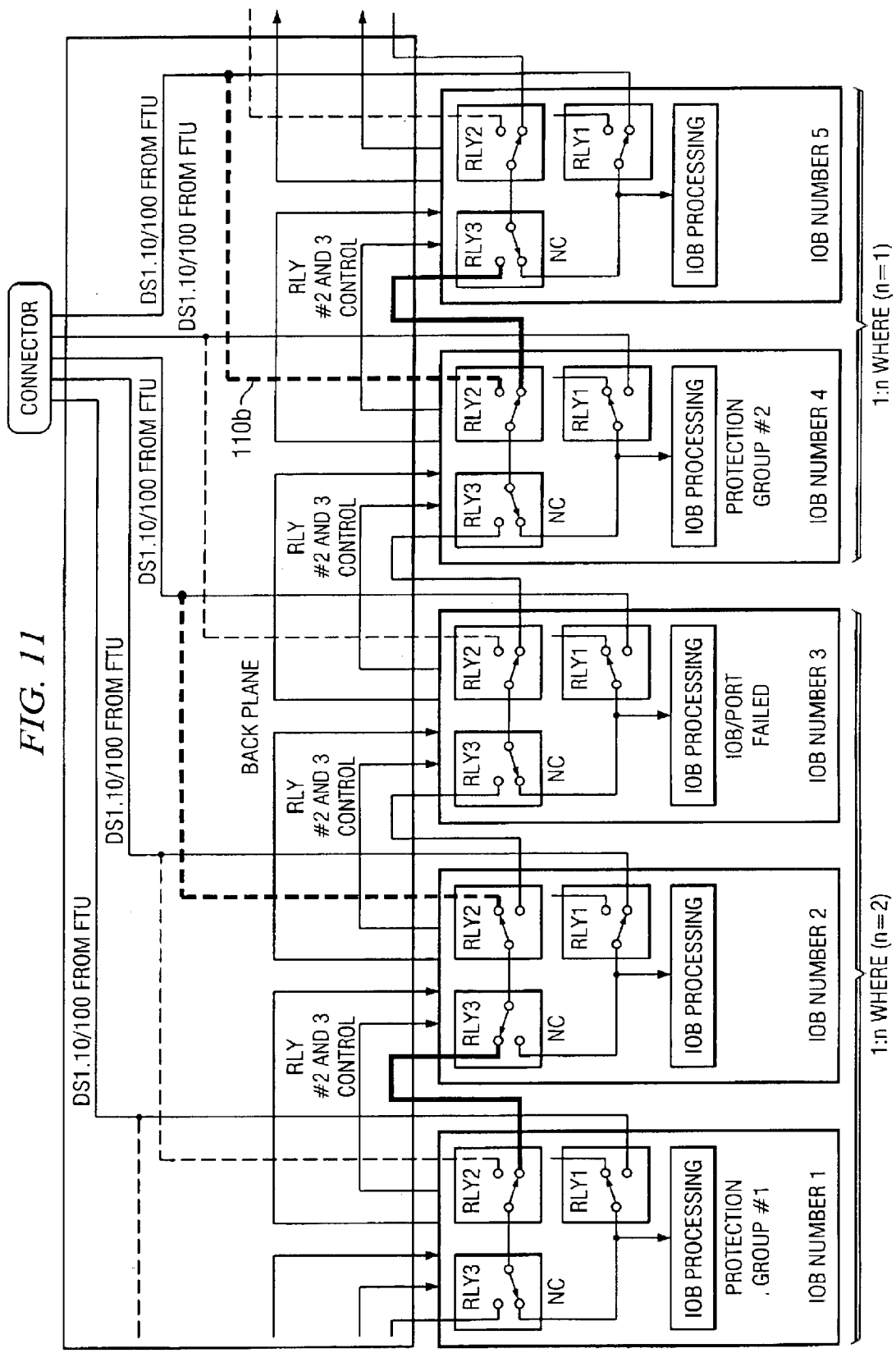
FIG. 11 depicts an embodiment of a protection system of the present invention in which two Protection Groups have been formed, and one Working Processing Module has failed in each Protection Group.

FIG. 11 depicts an embodiment of the present invention comprising two Protection Groups. In this embodiment, IOB #4 and IOB #5 form a 1:1 Protection Group, and IOB #1 through IOB #3 form a 1:2 Protection Group. These Protection Groups may be configured by an NCPM under, for example, operator control. For example, an NCPM may separate the two Protection Groups by segmenting the Protection Bus via RLY #3 of IOB #4. In some embodiments, the system may employ additional switching devices (other than those shown in the drawings) to segment the Protection Bus, as would be understood by those in the art. The ability to segment the Protection Bus allows embodiments of a protection system of the present invention to form multiple Protection Groups to accommodate varying protection needs, and to change the Protection Group configuration in response to further changes in those needs.

A failure in IOB #3 of the first Protection Group may cause some embodiments of the present invention to operate in a similar manner to the failure protection described above with reference to FIG. 6. A failure in IOB #5 in the second Protection Group may be handled as follows. IOB #5 activates its fail line, thereby informing the NCPM of its failure. RLY #1 of IOB #5 goes to its NC position, thereby isolating failed IOB #5 from its customers. NCPM commands the Protection Processing Module (IOB #4) to switch its RLY #2 away from the NC position, thereby connecting the Failure Path 110b of failed IOB #5 to the Protection Processing Module (IOB #4).

It should be understood that the preceding is merely a detailed description of some examples and embodiments of this invention and that numerous changes to the disclosed embodiments can be made in accordance with the disclosure herein without departing from the spirit or scope of the invention. The preceding description, therefore, is not meant to limit the scope of the invention.

I claim:

1. A protection system comprising:

a plurality of Processing Modules arranged in series, the plurality of Processing Modules including at least one Protection Processing Module and at least two Working Processing Modules;

wherein each Processing Module includes a signal path operable to provide a signal output, the signal path including:

a Normal Path operable to provide a first signal output, and a Failure Path connected to a Normal Path of an adjacent Working Processing Module, the Failure Path operable to provide a second signal output over the Normal Path of the adjacent Working Processing Module in response to a failure in the adjacent Working Processing; module and a Protection Bus for connecting the Protection Processing Module through any intermediate Working Processing Modules to the Working Processing Module adjacent to a failed Working Processing Module, the Protection Processing Module operable to provide the second signal output over the Protection Bus for the Normal Path of the failed Working Processing Module.

2. The protection system of claim 1, wherein the Protection Bus includes a plurality of Protection Bus Segments, each Protection Bus Segment associated with at least one Working Processing Module.

3. The protection system of claim 2, further comprising, for each of i=1 to n Working Processing Modules, an ith signal path including an ith Normal Path that is connected to the ith Working Processing Module and an ith Failure Path that is connected to an (i+1)th Processing Module that is logically adjacent to the ith Working Processing Module, wherein the first Working Processing Module is the Working Processing Module that is adjacent to the Protection Processing Module, and the nth Working Processing Module is the Working Processing Module that is logically the farthest Processing Module from the Protection Processing Module.

4. The protection system of claim 3, wherein the Protection Bus includes n−1 Protection Bus Segments, and, for i=1, a first Protection Bus Segment connects a first Working Processing Module to the Protection Processing Module, and for i=2 to n−1, the ith Protection Bus Segment connects the ith Working Processing Module to the (i+1)th Working Processing Module.

5. The protection system of claim 4, wherein, for i=2 to n, upon failure of the ith Working Processing Module, a connection is formed from the Protection Processing Module to (i−1)th Failure Path via the (i−1)th Protection Bus Segment.

6. The protection system of claim 5, wherein the connection formed from the Protection Processing Module to (i−1)th Failure Path further includes a switching device associated with the (i−1)th Working Processing Module.

7. The protection system of claim 6, wherein the connection formed between the Protection Processing Module and (i−1)th Failure Path includes each Protection Bus Segment logically between (i−1)th Failure Path and the Protection Processing Module.

8. The protection system of claim 5, wherein, for i=1, upon failure of the first Working Processing Module a connection is formed from the Protection Processing Module to the Normal Path of the first Working Processing Module, and the connection does not include a Protection Bus Segment associated with a Working Processing Module.

9. The protection system of claim 8, wherein the connection formed between the Protection Processing Module and the Normal Path of the first Working Processing Module includes a switching device associated with the Protection Processing Module.

10. The protection system of claim 2, wherein the plurality of Processing Modules include at least one switching device for connecting the at least one Protection Bus Segment associated with each of the plurality of Processing Modules to at least one other Protection Bus Segment.

11. The protection system of claim 10, wherein the at least one switching device includes at least one electromechanical switching device.

12. The protection system of claim 10, wherein the at least one switching device includes at least one optical switching device.

13. The protection system of claim 2, further comprising:

means for configuring the plurality of Processing Modules into a plurality of Protection Groups, each Protection Group including at least one Working Processing Module and at least one Protection Processing Module.

14. The protection system of claim 13, wherein the configuring means includes a Network Control Processing Module.

15. The protection system of claim 13, wherein the configuring means includes at least one switching device.

16. The protection system of claim 13, wherein the plurality of Processing Modules are configured into a plurality of Protection Groups, each Protection Group including at least one Working Processing Module and at least one Protection Processing Module.

17. The protection system of claim 13, wherein the configuring means includes a Distributed Processor Array.

18. The protection system of claim 17, wherein the Distributed Processor Array includes at least one of the plurality of Processing Modules.

19. The protection system of claim 2, wherein the plurality of Processing Modules are associated with a backplane.

20. The protection system of claim 19, wherein the backplane includes an electronic circuit board.

21. The protection system of claim 19, wherein the backplane includes a plurality of slots.

22. The protection system of claim 21, wherein at least one of the plurality of slots is specially adapted for use with a Network Control Processing Module.

23. The protection system of claim 22, wherein the Network Control Processing Module includes a Distributed Processor Array.

24. The protection system of claim 1, wherein, upon failure of a Working Processing Module, a connection is formed from the Protection Processing Module to the Failure Path of a Working Processing Module adjacent to the failed Working Processing Module.

25. The protection system of claim 24, wherein the failed Working Processing Module is not adjacent to the Protection Processing Module.

26. The protection system of claim 1, wherein at least one of the plurality of Processing Modules includes a Distributed Processor Array.

27. A protection system apparatus comprising:

a plurality of slots arranged in series, the plurality of slots including a first slot and a second slot, wherein the second slot is logically adjacent to the first slot;

a signal path including a first Normal Path connected to the first slot, a second Normal Path connected to the second slot, a first Failure Path connecting the first slot to the second Normal Path of the second slot in order to provide a signal output for the second Normal Path upon a failure associated with the second slot, a second Failure Path operable to connect the second slot to a Normal Path of a third slot;

a Protection Bus including at least one Protection Bus Segment for connecting two adjacent slots.

28. The apparatus of claim 27, wherein the plurality of slots further include a third slot.

29. The apparatus of claim 28, wherein the first, second, and third slots are configured to accommodate Processing Modules, and wherein, upon failure of a Processing Module in the first slot, a connection is formed through the Processing Module in the second slot to connect the Failure Path connected to the second slot to a Processing Module in the third slot.

30. The apparatus of claim 29, wherein the first slot is not logically adjacent to the third slot.

31. A protection system apparatus comprising
n slots; and
n−1 signal paths, wherein for each of i=1 to n−1 signal paths, the ith signal path includes an ith Normal Path that is connected to an ith slot, and an ith Failure Path that is connected to an (i+1)th Normal Path of an (i+1)th slot that is logically adjacent to the ith slot in order to provide a signal output for the (i+1)th slot upon a failure associated with the (i+1)th slot.

32. The apparatus of claim 31, further comprising:
a Protection Bus including n−1 Protection Bus Segments, and, for each of i=1 to n−1 Protection Bus Segments, the ith Protection Bus Segment connects the ith slot to an (i+1)th slot that is logically adjacent to the ith slot.

33. The apparatus of claim 32, wherein, for i=2 to n−1, upon failure of a Working Module in the ith slot, a connection is formed at the (i−1)th slot that is logically adjacent to the ith slot between the (i−1)th Failure Path and the (i−2)th Protection Bus Segment.

34. The apparatus of claim 33, wherein the connection formed at the ith slot that is logically adjacent to the (i−1)th slot between the (i−1)th Failure Path and the (i−2)th Protection Bus Segment further includes a switching device associated with a Working Processing Module in the (i−1)th slot.

35. A protection system comprising:
a plurality of Processing Modules arranged in series, the plurality of Processing Modules including at least one Protection Processing Module and at least two Working Processing Modules, a first Working Processing Module is an adjacent Working Processing Module that is logically adjacent to a second Working Processing Module in the direction of the Protection Processing Module;
for each working Processing Module, a signal path includes a Normal Path connected to the first Working Processing Module, a Failure Path connected between the first Working processing Module and a Normal Path of the second Working Processing Module, the Failure Path of the first Working processing Module operable to provide a signal output for the Normal Path of the second Working Processing Module upon a failure associated with the second Working processing Module; and
a Protection Bus for connecting the Protection Processing Module through any intermediate Working processing Modules to the failure Path of any Working Processing Module.

36. The protection system of claim 35, wherein each of the Working Processing Modules except for a terminating Working Processing Module is an adjacent Working Processing Module.

37. A protection system, comprising:
a plurality of slots for accommodating a plurality of Processing Modules, each of the plurality of Processing Modules capable of performing a service;
a plurality of Protection Bus Segments, each Protection Bus Segment capable of forming a connection between two adjacent slots;
means for forming a Protection Group including a plurality of Processing Modules capable of being interconnected in series by a plurality of the plurality of Protection Bus Segments; and
means for designating a Protection Processing Module within the Protection Group, such that upon failure of a Processing Module in the Protection Group other than the Protection Processing Module, the Protection Processing Module becomes capable of providing a signal output to the slot associated with the failed Processing Module over the Protection Bus Segments.

38. A protection system method, comprising:
providing at least one Protection Group, the at least one Protection Group including a Protection Processing Module and at least one Working Processing Module;
providing a segmented Protection Bus operatively linking the Protection Processing Module and the at least one Working Processing Module; and
providing a signal path operable to provide a signal output, the signal path including a Normal Path that can be connected to the first Working Processing Module and a Failure Path that can be connected between the Normal Path of the first Working Processing Module and a Processing Module that is logically adjacent to the first Working Processing Module, wherein upon failure of the first Working Processing Module, a connection is formed from the Protection Processing Module to the Failure Path connected to the Processing Module that is logically adjacent to the first Working Processing Module in order to provide a signal output on the Normal Path of the first Working Processing Module.

* * * * *